2 Sheets—Sheet 1.
A. B. FLACH.
SAFETY GATE.
No. 10,342. Reissued June 19, 1883.
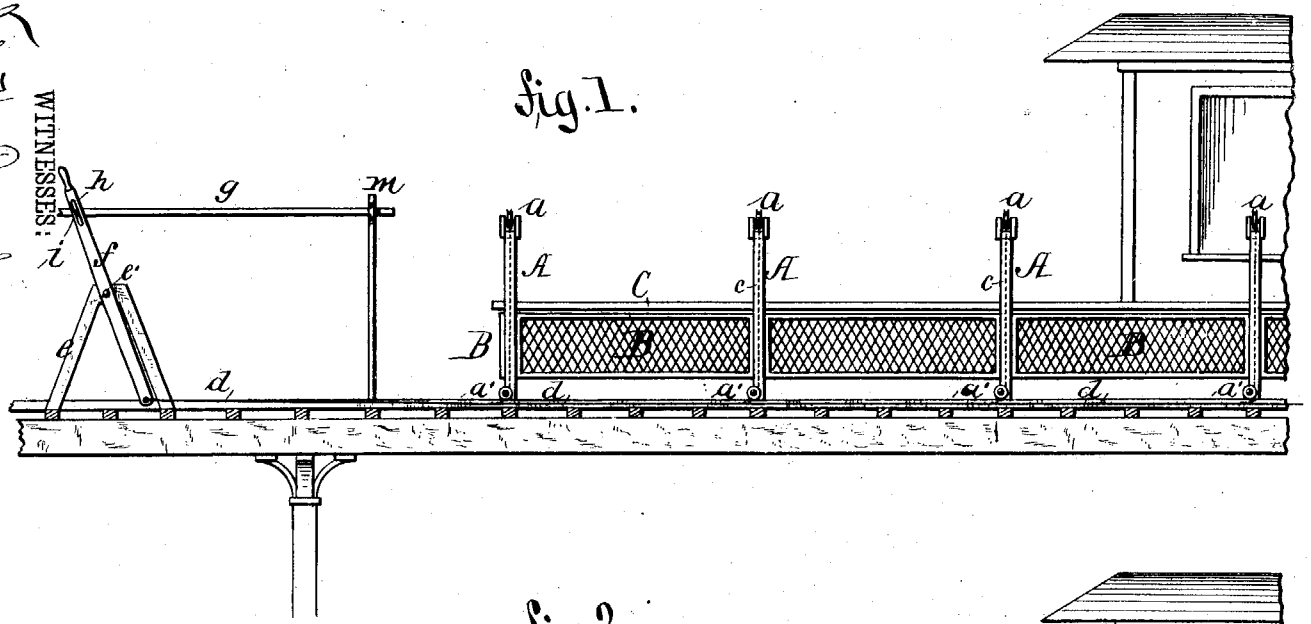
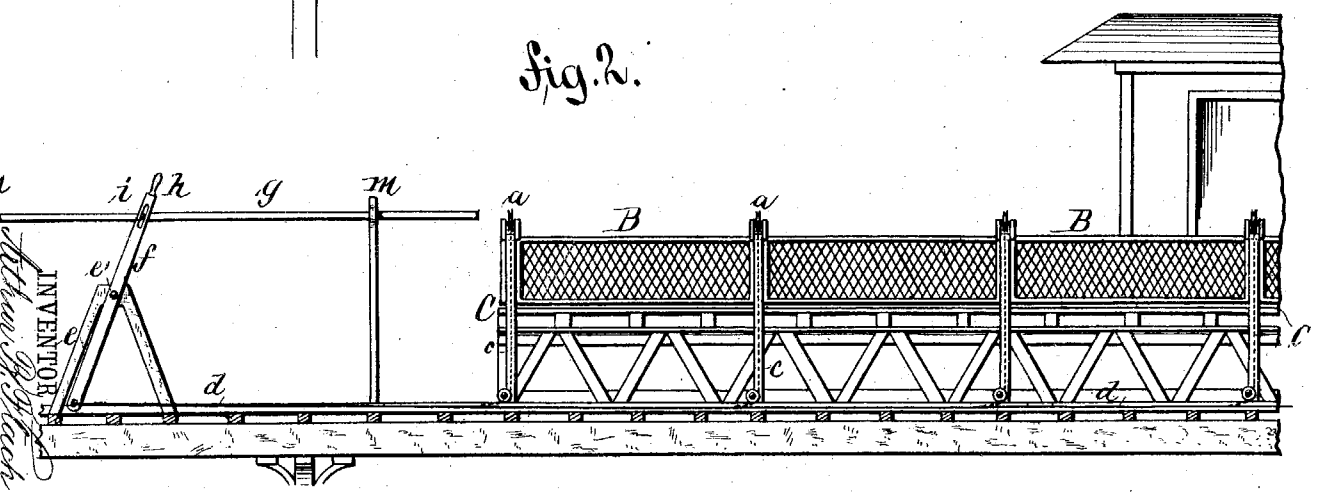
WITNESSES:
Fr. H. Rosenbaum.
Carl Kemp
INVENTOR:
Arthur B. Flach
BY Paul Goepel
ATTORNEY
N. PETERS, Photo-Lithographer, Washington, D. C.

A. B. FLACH.
SAFETY GATE.
No. 10,342. Reissued June 19, 1883.
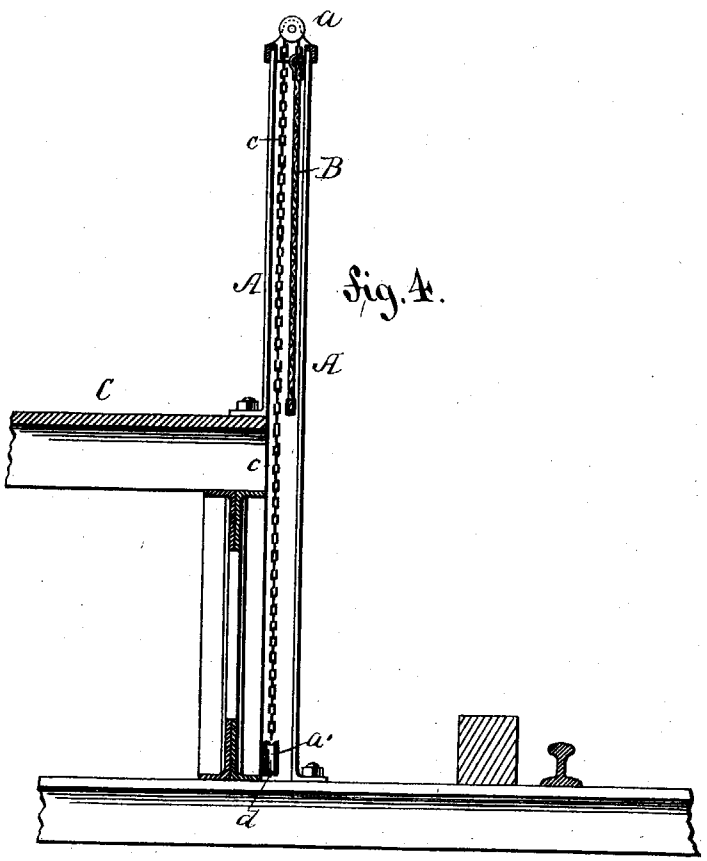
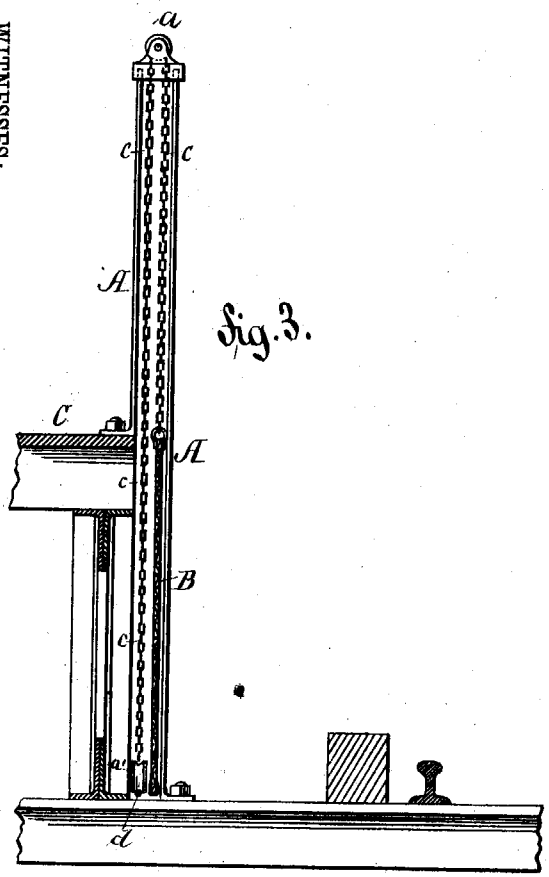
WITNESSES:
F. H. Rosenbaum.
Carl Kaup
INVENTOR
Arthur B. Flach
BY Paul Goepel
ATTORNEY
N. PETERS, Photo-Lithographer, Washington, D. C.

UNITED STATES PATENT OFFICE.

ARTHUR B. FLACH, OF NEW YORK, N. Y.

SAFETY-GATE.

SPECIFICATION forming part of Reissued Letters Patent No. 10,342, dated June 19, 1883.

Original No. 263,037, dated August 22, 1882. Application for reissue filed January 29, 1883.

*To all whom it may concern:*

Be it known that I, ARTHUR B. FLACH, of the city, county, and State of New York, have invented certain new and useful Improvements in Safety-Gates, of which the following is a specification.

This invention relates to improvements in safety-gates for the platforms of railway-stations, so as to prevent passengers from entering into railway-trains while in motion, or from prematurely leaving the same, the gate being specially applicable to elevated-railway stations; and the invention consists of the combination, with the platform of a railway-station, of a safety-gate arranged to move vertically along the edge of the platform, means whereby the gate is raised or lowered above or below the platform, and means whereby the same is retained in either raised or lowered position, as will more fully appear hereinafter, and finally be pointed out in the claims.

In the accompanying drawings, Figures 1 and 2 represent front views of my improved safety-gate for the platforms of railway-stations, showing it respectively in lowered and raised position. Figs. 3 and 4 are detail vertical transverse sections of the same, showing a portion of the platform and track and the safety-gate, respectively, in lowered or raised position.

Similar letters of reference indicate corresponding parts.

Referring to the drawings, A A represent a number of upright posts, which are arranged at suitable distances apart along the edge of the platform C, and extended to a proper height and depth above and below the platform.

The posts A are secured to the platform and to the cross-ties of the track, and provided with pulleys *a* at their upper ends and pulleys *a'* at their lower ends. The posts A may be made of flat iron bars with cast-iron caps, or in any other approved manner, they serving as guides for the vertically-movable safety-gate B. The gate B is preferably made of wire-cloth, properly framed and extended along the entire length of the platform. At each post a rope or chain, *c*, is attached to the upper part of the gate, and then passed first over the upper, then over to the lower, pulley of the post, the ends of the chains being fastened to a rod, *d*, which extends along the entire length of the platform and is guided in suitable manner on the cross-ties of the track. The rod *d* is extended beyond the platform at that end at which the locomotive is expected to stop. A lever, *f*, is at this point mounted upon a stand, *e*, in such a manner that it may be oscillated on its fulcrum-pin *e'*. The lower end of the lever *f* is connected to the outer end of the rod *d*, and the upper end provided with a handle and connected by a slot, *h*, to the pin *i* of a horizontal hand-bar, *g*, which is supported in guide-openings of vertical standards *m n*, so as to slide freely therein.

By moving the hand-bar *g* toward the platform the lever *f* is moved around its fulcrum, its lower end pulling the rod *d* forward, which by the intermediate chains raises the gate B vertically along the edge of the platform until the same is lifted above the platform, as shown in Fig. 2. When the hand-bar *g* is moved in an opposite direction, the rod *d* is pushed back and the gate descends along the edge of the platform by its own weight. The gate is held in raised or lowered position either by balance-weights or by catches, which latter have to be released by the engineer before the gate can be raised or lowered.

The safety-gate of the station-platform is intended to be operated by the engineer of the passing train. When all the passengers are taken into the train and the gates of the car-platforms are closed, the engineer pulls the hand-bar *g* and raises thereby the gate above the platform. On arriving at the next station at which the gate is raised the engineer pulls the hand-bar *g* in reverse direction, so as to lower the gate after the train has come to a stop. When the gate is in lowered position, it fills the space between the platform and the cars, the upper end of the gate being flush with the floor of the platform.

As the gate is always in raised position, except when a train is at the platform and ready to receive passengers, numerous accidents that occur by the carelessness and inadvertence of the passengers and employés can be avoided.

Having thus described my invention, I claim as new and desire to secure by Letters Patent—

1. In a safety-gate for elevated railways, the combination of the vertical lever *f* and the supporting-frame to which the lever is centrally pivoted, the sliding hand-bar to which the slotted end of said vertical lever is connected, and the horizontal reciprocating rod that moves along the foot of the platform and engages the gate-chains, substantially as described.

2. As an improvement in safety-gates for railways, a platform at an elevation sufficiently high to permit non-expansible gates to be raised and lowered between the platform and the rail-ties, in combination with open vertical posts, the chains and gates which are guided in the open spaces, the pulleys at the tops and bottoms of the posts, the horizontal sliding rod to which the lever ends of the chains are fastened, and a lever mechanism for operating said rod, substantially as described.

3. The combination, with the platform of a railway-station having vertical guide-posts A A, of a gate, B, chains *c*, pulleys *a a'*, rod *d*, fulcrumed lever *f*, and horizontally-guided hand-bar *g*, substantially as described.

In testimony whereof I affix my signature in presence of two witnesses.

ARTHUR B. FLACH.

Witnesses:

PAUL GOEPEL,

SIDNEY MANN.